United States Patent [19]

Colonias et al.

[11] Patent Number: 5,104,252
[45] Date of Patent: Apr. 14, 1992

[54] HANGER CONNECTION

[75] Inventors: Karen W. Colonias, Pleasant Hill; William F. Leek, Anaheim, both of Calif.

[73] Assignee: Simpson Strong-Tie Company, Inc., San Leandro, Calif.

[21] Appl. No.: 786,084

[22] Filed: Oct. 31, 1991

[51] Int. Cl.⁵ .............................................. B25G 3/00
[52] U.S. Cl. .................................. 403/232.1; 403/230; 52/702
[58] Field of Search ............... 403/232.1, 230; 52/702, 52/712, 289

[56] References Cited

U.S. PATENT DOCUMENTS

| | | | |
|---|---|---|---|
| 414,169 | 10/1889 | Reuschel . | |
| 625,427 | 5/1899 | Stewart . | |
| 666,918 | 1/1901 | Butz . | |
| 753,053 | 2/1904 | Eberhardt . | |
| 770,050 | 9/1904 | Dreyer . | |
| 3,036,347 | 5/1962 | Findleton . | |
| 3,633,950 | 1/1972 | Gilb | 287/20.94 |
| 3,752,512 | 8/1973 | Gilb | 287/20.94 |
| 3,972,169 | 8/1976 | Sheppard | 52/702 |
| 4,480,941 | 11/1984 | Gilb | 403/232.1 |

OTHER PUBLICATIONS

Lester's Brochure, p. 3.
United Steel Products Co. catalog, (Kant-Sag catalog) page unknown.

Primary Examiner—Andrew V. Kundrat
Attorney, Agent, or Firm—James R. Cypher

[57] ABSTRACT

A connection in a wood frame building wherein a one piece sheet metal hanger connector is used to join together a wood supporting member, and one or two wood supported members. The connector is connected to the supporting member by a top flange and the supported members are joined to the connector as well as to the supporting member by fasteners driven through openings in flanges of the connector, through the supporting member, through the back wall of the connector and into the supporting member. The arrangement places the fasteners in double shear resulting in unusually large load holding capability for the size and weight of the sheet metal connector. The connector seat is fully supported at the sides and back resulting in high load holding capacity both downwardly and upwardly with unusual rigidity and resistance to lateral forces.

10 Claims, 7 Drawing Sheets

HANGER CONNECTION

BACKGROUND OF THE INVENTION

This invention relates to a light gauge sheet metal hanger connection. While the hanger connection of the present invention may be used in various wood building construction applications, one of its major applications is in post frame construction.

An example of post frame construction are pole barns which have a very short construction time period, and because of the rapid construction pace it is necessary that the hanger connectors be easy to install and fairly inexpensive. The basic configuration of a pole barn, large door openings and light weight material, make the structure a perfect candidate for uplift resistant hanger connectors of the present invention.

SUMMARY OF THE INVENTION

The hanger connection of the present invention provides the following benefits.

1. The formed seat of the connector hanger allows for high strength from a light gauge material. The hanger connector can be made from 20 gauge material rather than 18 gauge material. The formed seat gives full bearing as well as some lateral support provided by the continuous side flange.

2. The double shear slant nails allow for less nails to be installed in the hanger connection while providing the needed uplift and down load requirements.

3. The funnel shape of the upper portions of the side flanges of the hanger connector allows the purlins to drop easily into the hanger connector without getting caught on the side flanges.

DESCRIPTION OF THE PREFERRED EMBODIMENT OF THE INVENTION

The hanger connection 1 illustrated in FIGS. 1-5 is most generally used in wood frame building construction and includes a wood supporting member 2 having a top edge 3 and a front face 4, and a wood supported member 5 having an end face 6, a bottom edge 7, generally parallel side faces 8 and 9, and a hanger connector 10.

The hanger connector 10 is preferably constructed from a single sheet metal member and includes: a top flange member 11 disposed in registration with the top edge 3 of the wood supporting member 2 which has a front edge 12; a back member 13 having a top edge 14 integrally connected to the front edge 12 of the top flange member 11 along a substantial portion thereof and disposed in registration with the front face 4 of the wood supporting member 2 and the end face 6 of the wood supported member 5 and formed with at least one first fastener receiving back opening 15 therethrough, and having side edges 16 and 17 including upper portions 18 and 19 and lower portions 20 and 21 in which the lower portions 20 and 21 are generally parallel to one another and the upper portions 18 and 19 curve outwardly therefrom, and a bottom edge 22; first and second side flange members 23 and 24 disposed in registration with the side faces 8 and 9 of the wood supported member 5 having rear edges 25 and 26 including upper portions 27 and 28 and lower portions 29 and 30 integrally connected to the side edges 16 and 17 of the back member 13 with the lower portions 29 and 30 generally parallel and the upper portions 27 and 28 curving outwardly therefrom, and generally parallel bottom edges 31 and 32, and front edges 33 and 34 having a substantial portion parallel to one another; a seat member 35 disposed in registration with a portion of the bottom edge 7 of the wood supported member 5 having a rear edge 36 integrally connected to the bottom edge 22 of the back member 13 throughout substantially its entire width, side edges 37 and 38 integrally connected respectively to the bottom edges 31 and 31 of the first and second side flange members 23 and 24 throughout substantially their entire width, and a front edge 39; and at least one of the first or second side flange members 23 or 24 being formed with at least one first slotted fastener opening 40.

Figure 1:
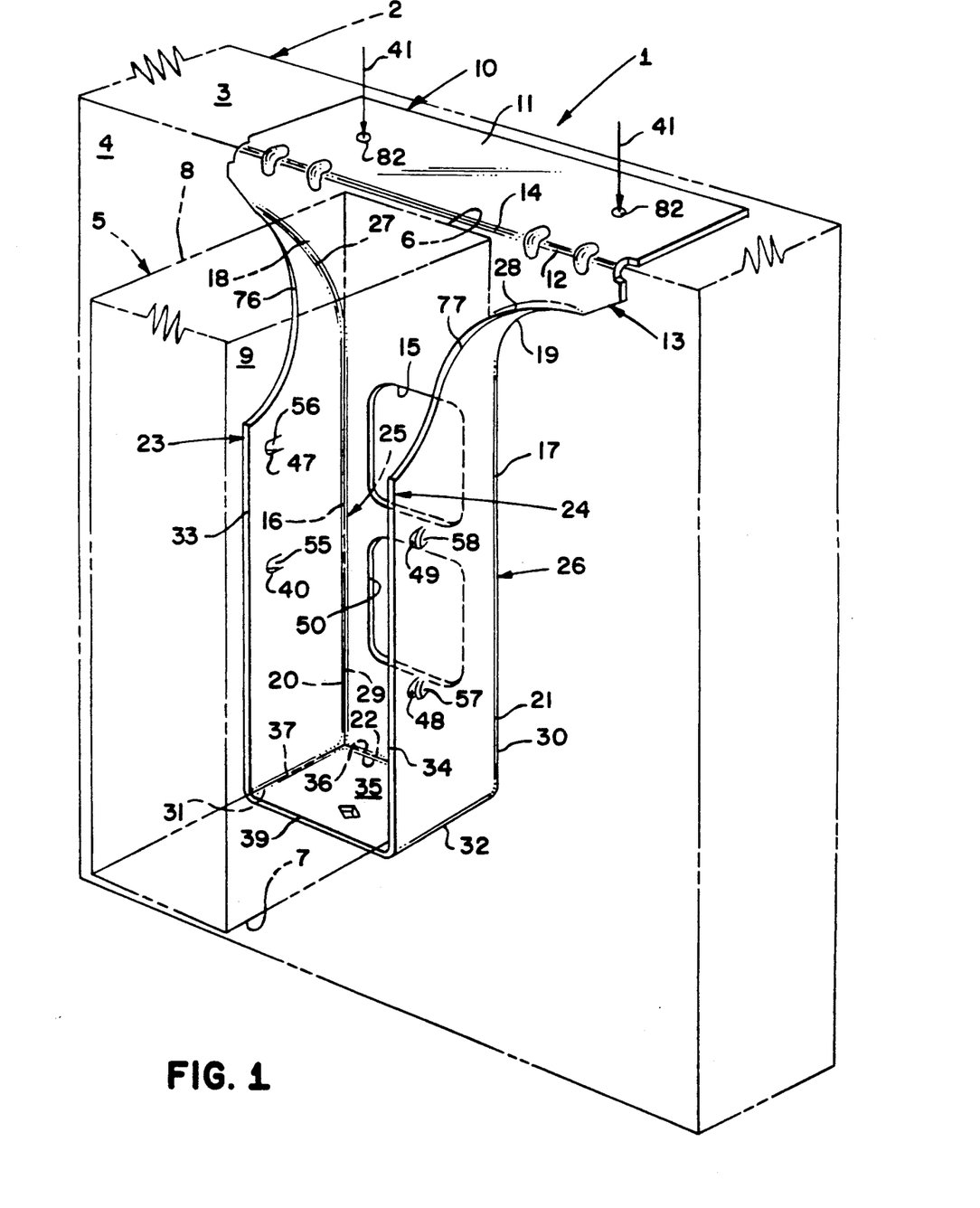
FIG. 1 is a perspective view of one form of the hanger connection of the present invention.

The hanger connection further includes top flange fastener means indicated by arrows 41 in FIG. 1 such as nails, screws or integrally formed prongs driven through openings 82 in the top flange member 11 of the sheet metal connector 10 into the top edge 3 of the wood supporting member 2.

Figure 2:
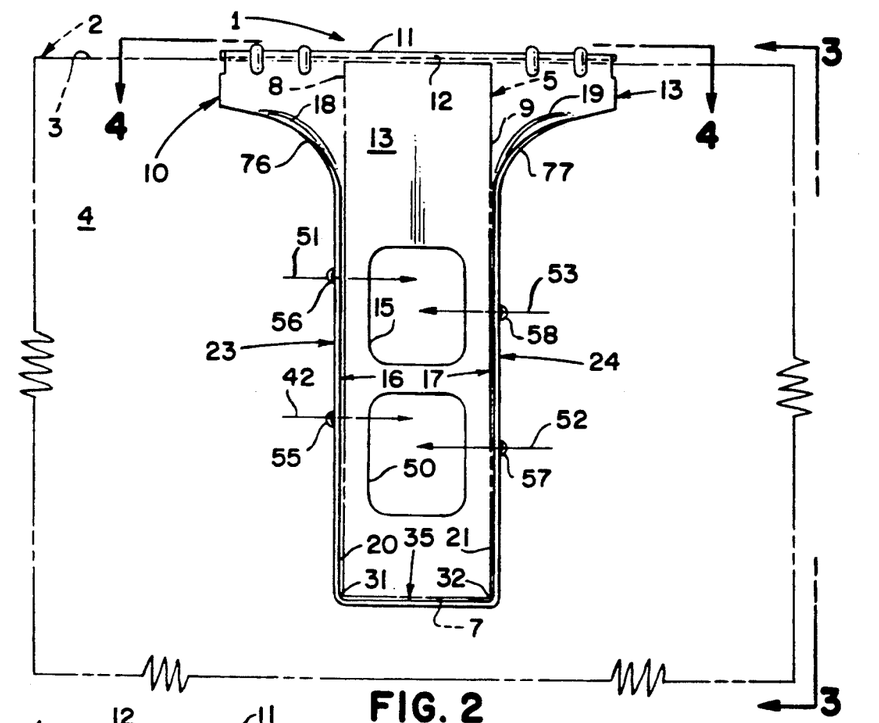
FIG. 2 is a front view of the hanger connection of FIG. 1.
Figures 3, 4:
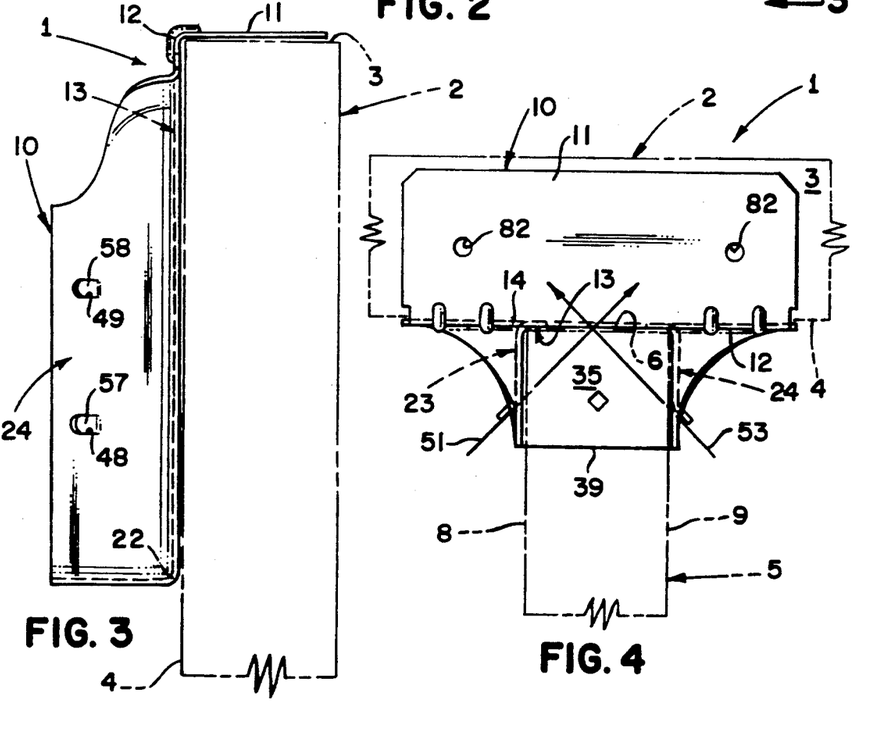
FIG. 3 is a side view of the hanger connection of FIG. 1 taken along line 3—3 in FIG. 2.
FIG. 4 is a top plan view of the hanger connection of FIG. 1 taken along line 4—4 in FIG. 2.

Finally, the hanger connection also includes a first flange fastener means such as a nail or screw as indicated by arrow 42 in FIG. 2 driven through the first slotted fastener opening 40 in at least one of the side flange members 23 or 24 of the sheet metal connector 10 through a portion of the wood supported member 5, through the second fastener receiving back opening 50 in the back member 13 and into structural engagement with the wood supporting member 2.

Figure 5:
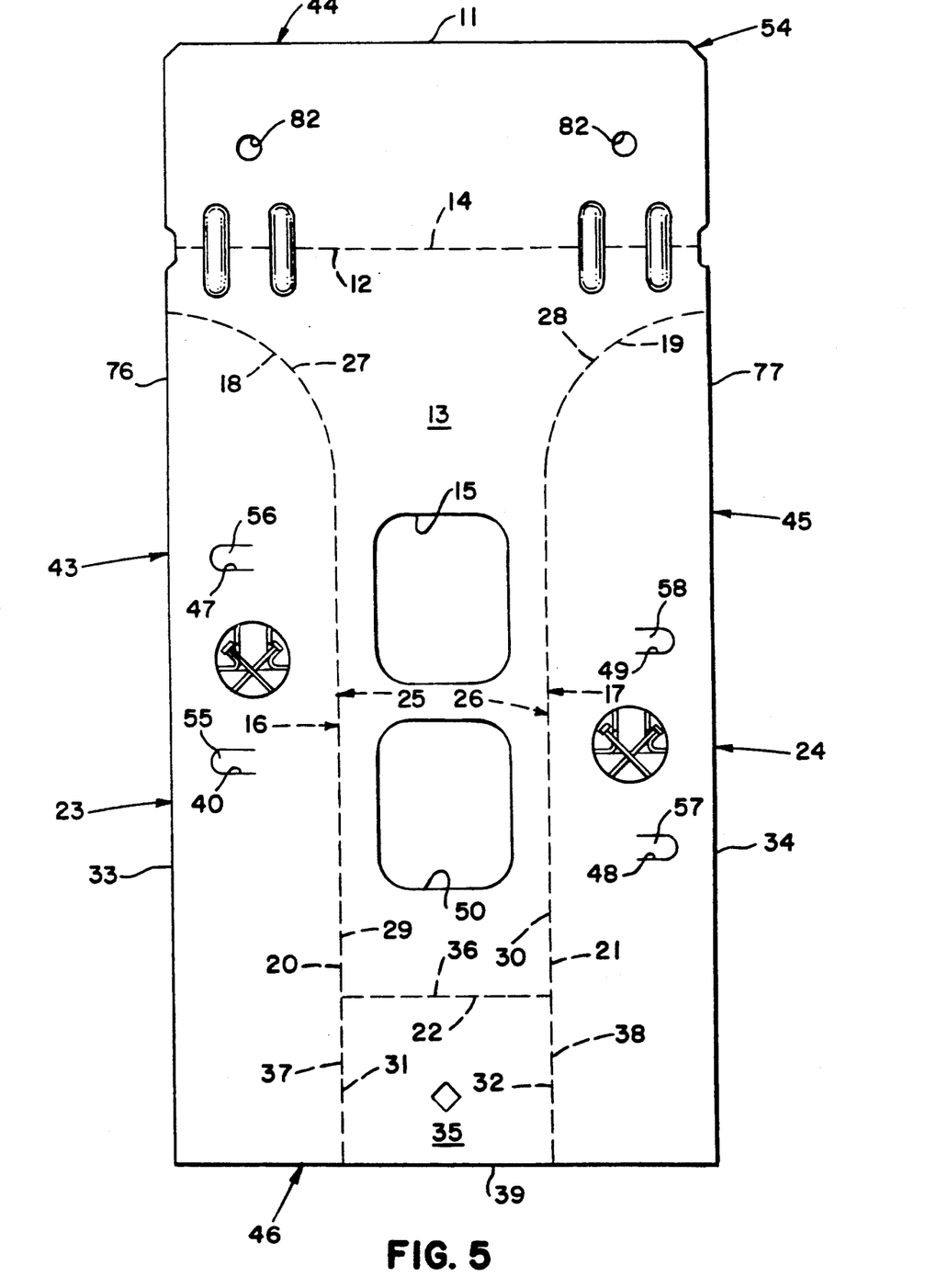
FIG. 5 is a top plan view of the sheet metal blank from which the hanger connector illustrated in FIG. 1 is formed.

A unique feature of the hanger connection 1 of the present invention is the fact that the hanger connector 10 is formed from one piece of sheet metal formed from a rectangular blank 54 in which all four edges 43, 44, 45, and 46 of the blank as illustrated in FIG. 5 are generally straight lines and remain substantially uncut. This permits the hanger connector to be efficiently cut from an elongated strip of sheet metal on a progressive die with a minimum of waste metal.

A further feature of the hanger connection of the present invention is that the first and second side flange members 23 and 24 have substantially the same width as the length of the first seat member and the width remains substantially constant throughout a substantial portion of the length of the first and second side flange members 23 and 24. This feature provides maximum holding strength to the hanger connector 10 in supporting the wood supported member 2, and maximum rigidity to the hanger connector 10 in resisting lateral forces imposed by the supported member 2.

Preferably, each of the first and second side flange members 23 and 24 are formed with a plurality of linearly disposed spaced first slotted fastener openings 47, 48, and 49 and the first back member 13 is formed with a plurality of longitudinally spaced first and second fastener receiving back openings 15 and 50 and the first flange fastener means 42 includes a plurality of fasteners each individually driven respectively through one of the linearly disposed spaced first slotted fastener openings 40, 47, 48, and 49, through a portion of said wood supported member 5, through one of the first or second fastener receiving back openings 15 or 50 in the back member and into structural engagement with the wood supporting member 2. The construction of the hanger connector 10 in this manner permits double shear nailing as set forth in U.S. Pat. No. 4,480,941 to Gilb, granted Nov. 6, 1984.

Each of the first slotted fastener openings 40, 47, 48, and 49 includes a tab member 55, 56, 57, and 58 formed from the material created by the first slotted fastener openings 40, 47, 48, and 49 which is bent to directionally guide the first flange fasteners 42, 51, 52, and 53 toward one of said first or second fastener receiving back openings 15 or 50 in the back member 13. A detailed explanation of the structure and function of the tab members 55, 56, 57, and 58 is taught in U.S. Pat. No. 4,480,941 to Gilb, granted Nov. 6, 1984.

An alternate form of the invention is illustrated in FIGS. 6-11. The alternate form is a double hanger connection 61 in a wood frame building including a wood supporting member 2' having a top edge 3', a front face 4', and a rear face 62 and first and second wood supported members 63 and 64 each having an end face 65 and 66, a bottom edge 67 and 68 and generally parallel side faces 69, 70, 71, and 72, and a one piece double sheet metal hanger connector 73.

The one piece double sheet metal hanger connector 73 includes: a top flange member 11' disposed in registration with the top edge 3' of the wood supporting member 2', and having front and rear edges 74 and 75; a first back member 13' having a top edge 14' integrally connected to the front edge 74 of the top flange member 11' along a substantial portion thereof disposed in registration with the front face 4' of the wood supporting member 2' and the end face 65 of the first wood supported member 63 formed with at least one first fastener receiving back opening 15' therethrough, and having side edges 16' and 17' including upper and lower portions 18' and 19', 20' and 21' in which the lower portions 20' and 21' are generally parallel to one another and the upper portions 18' and 19' curve outwardly therefrom, and a bottom edge 22'; first and second side flange members 23' and 24' disposed in registration with the side faces 69 and 70 of the first wood supported member 63 having rear edges 25' and 26' including upper and lower portions 27', 28', 29' and 30' integrally connected to the side edges 16' and 17' of the first back member 13' with the lower portions 29' and 30' generally parallel and the upper portions 27' and 28' curving outwardly therefrom, and generally parallel bottom edges 31' and 32', and front edges 33' and 34' having a substantial portion parallel to one another; a first seat member 35' disposed in registration with a portion of the bottom edge 67 of the first wood supported member 63 having a rear edge 36' integrally connected to the bottom edge 22' of the first back member 13' throughout substantially its entire width, side edges 37' and 38' integrally connected respectively to the bottom edges 31' and 32' of the first and second side flange members 23' and 24' throughout substantially their entire width, and a front edge 39'; at least one of the first or second side flange members 23' and 24' is formed with at least one first slotted fastener opening 40'; a second back member 13" having a top edge 14" integrally connected to the rear edge 75 of the top flange member 11' along a substantial portion thereof disposed in registration with the rear face 62 of the wood supporting member 2' and the end face 66 of the second wood supported member 64 and formed with at least one second fastener receiving back opening 15" therethrough, and having side edges 16" and 17" including upper portions 18" and 19" and lower portions 20" and 21" in which the lower portions 20" and 21" are generally parallel to one another and the upper portions 18" and 19" curve outwardly therefrom, and a bottom edge 22"; third and fourth side flange members 23" and 24" disposed in registration with the side faces 71" and 72" of the second wood supported member 64 having rear edges 25" and 26" including upper portions 27" and 28" and lower portions 29" and 30" integrally connected to the side edges 16" and 17" of the second back member 13" with the lower portions 29" and 30" generally parallel and the upper portions 27" and 28" curving outwardly therefrom, and generally parallel bottom edges 31" and 32", and front edges 33" and 34" having a substantial portion parallel to one another; a second seat member 35" disposed in registration with a portion of the bottom edge 68 of the second wood supported member 64 having a rear edge 36" integrally connected to the bottom edge 22" of the second back member 13" throughout substantially its entire width, side edges 37" and 38" integrally connected respectively to the bottom edges 31" and 32" of the third and fourth side flange members 23" and 24" throughout substantially their entire width, and a front edge 39"; at least one of the third or fourth flange members 23" or 24" is formed with at least one second slotted fastener opening 40"; top flange fastener means 41' such as nails or prongs driven through openings 82' in the top flange member 11' of the one piece double sheet metal hanger connector 73 into the top edge 3' of the wood supporting member 2'; first flange fastener means 42' driven through the first slotted fastener opening 40' in at least one of the first or second side flange members 23' or 24' of the one piece double sheet metal hanger connector 73, through a portion of the first wood supported member 63, through the first fastener receiving back opening 15' in the first back member 13' and into structural engagement with the wood supporting member 2'; and second flange fastener means 42" driven through the second slotted fastener opening 40" in at least one of the third or fourth side flange members 23" or 24" of the one piece double sheet metal hanger connector 73, through a portion of the second wood supported member 64, through the second fastener receiving back opening 15" in the second back member 13" and into structural engagement with the wood supporting member 2'.

Figure 11:
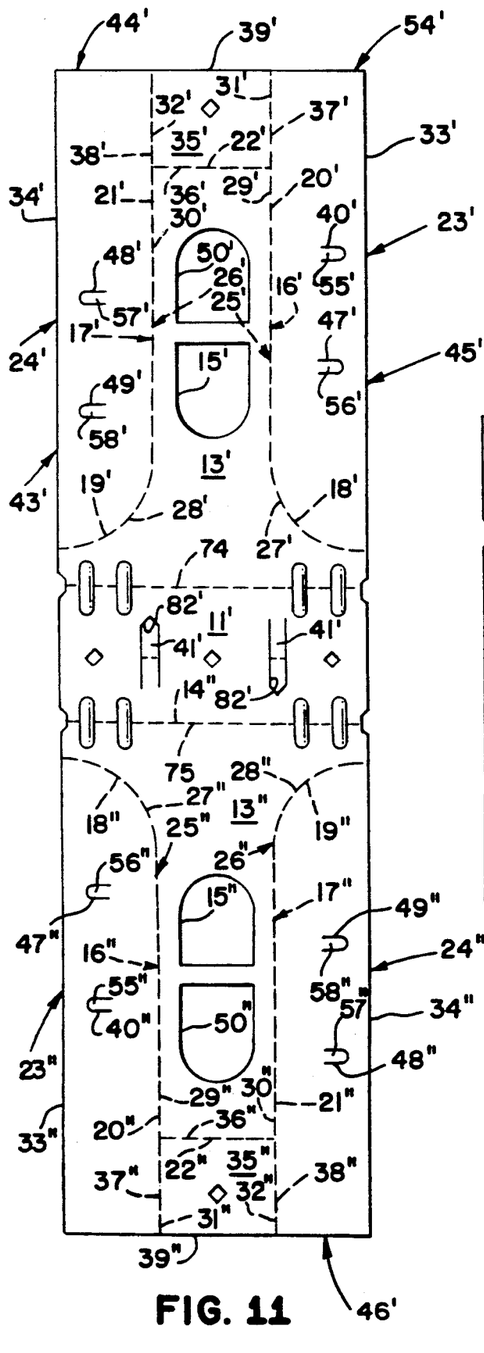
FIG. 11 is a top plan view of the sheet metal blank from which the hanger connector illustrated in FIG. 6 is formed.

The double hanger connection 61 includes a one piece sheet metal hanger connector 73 which is formed from a rectangular blank 54' in which all four edges 43', 44', 45', and 46' are generally straight lines and remain substantially uncut.

The double hanger connection 61 includes a one piece double sheet metal connector 73 which is preferable constructed so that the first and second side flange members 23' and 24' have substantially the same width as the length of the first seat member 35' and the width remains substantially constant throughout a substantial portion of the length of the first and second side flange members 23' and 24'. In addition the third and fourth side flange members 23" and 24" are constructed so that they have substantially the same width as the length of the second seat member and the width remains substantially constant throughout a substantial portion of the length of the third and fourth side flange members 23" and 24".

The double hanger connection 61 is preferably constructed so that each of the first and second side flange members 23' and 24' are formed with a plurality of linearly disposed spaced first slotted fastener openings 47', 48' and 49'; the first back member 13' is formed with a longitudinally spaced second fastener receiving back opening 50'; and the first flange fastener means 42' includes a plurality of fasteners 51', 52', and 53' each individually driven respectively through one of said linearly disposed spaced first slotted fastener openings 47', 48', and 49', through a portion of said first wood supported member 63, through one of said first or second fastener receiving back openings 15' or 50' in said back member 13' and into structural engagement with said wood supporting member 2'; each of the third and fourth side flange members 23" and 24" are formed with a plurality of linearly disposed spaced second slotted fastener openings 47", 48", and 49"; the second back member 13" is formed with a longitudinally spaced second fastener receiving back opening 50"; and the second flange fastener means 42" includes a plurality of fasteners 51", 52", and 53" each individually driven respectively through one of the linearly disposed spaced second slotted fastener openings 47", 48", and 49", through a portion of the second wood supported member 64, through one of the first or second fastener receiving back openings 15" and 50" in the second back member 13" and into structural engagement with the wood supporting member 2'.

Preferably the one piece sheet metal hanger connector 73 is formed so that each of the first and second slotted fastener openings 40', 40", 47', 47", 48', 48", and 49' 49" includes a tab member 55', 55", 56', 56", 57, 57", and 58' 58" formed respectively from the material created by the first and second slotted fastener openings which is bent to directionally guide the first and second flange fasteners 42', 42'", 51', 51", 52', 52", and 53' 53" toward one of the first or second fastener receiving back openings 15' 15" and 50' 50" in the first and second back members 13' and 13".

Figure 12:
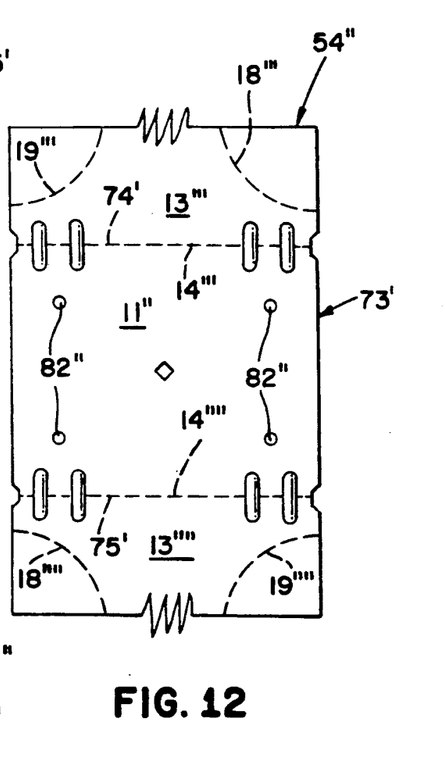
FIG. 12 is a top plan view of a portion of the sheet metal blank from which another form of the hanger connector illustrated in FIG. 6 is formed. This form is identical thereto except that the top flange is wider so that the hanger connector may be mounted on a double header member.

FIG. 12 illustrates another modified form of the invention illustrated in FIGS. 6-11. In those applications where the one piece sheet metal connector 73 is used with a double wood supporting member, the one piece sheet metal connector 73' partially illustrated in FIG. 12 can be made in an identical manner to that illustrated in FIGS. 6-11 except that the top flange member 11" is made with a greater width to accommodate the double wood supporting member. The modified form of the invention may be constructed from a rectangular blank 54" in the same manner as blank 54' illustrated in FIG. 11. A detailed description of the modified form is not required and a few parts have been labeled to indicate the construction of the modified form of the invention.

Illustrative parts for example are the top edges of back members 13'" and 13"" indicated by the numbers 14'" and 14"", upper portions of side edges of the back member indicated by the numbers 18'", 18"", 19'", 19"", fastener openings 82" and front edges 74' and 75' of the one piece double sheet metal connector 73'.

A structure which allows supported members 5 such as purlins to be dropped easily into the hanger connectors of the present invention is the use of the "funnel like" construction. As illustrated in FIGS. 1 and 2, upper portion 76 of front edge 33 of first side flange member 23 curves upwardly and outwardly. In like manner, upper portion 77 of of front edge 34 of second side flange member 24 also curves upwardly and outwardly.

Figure 6:
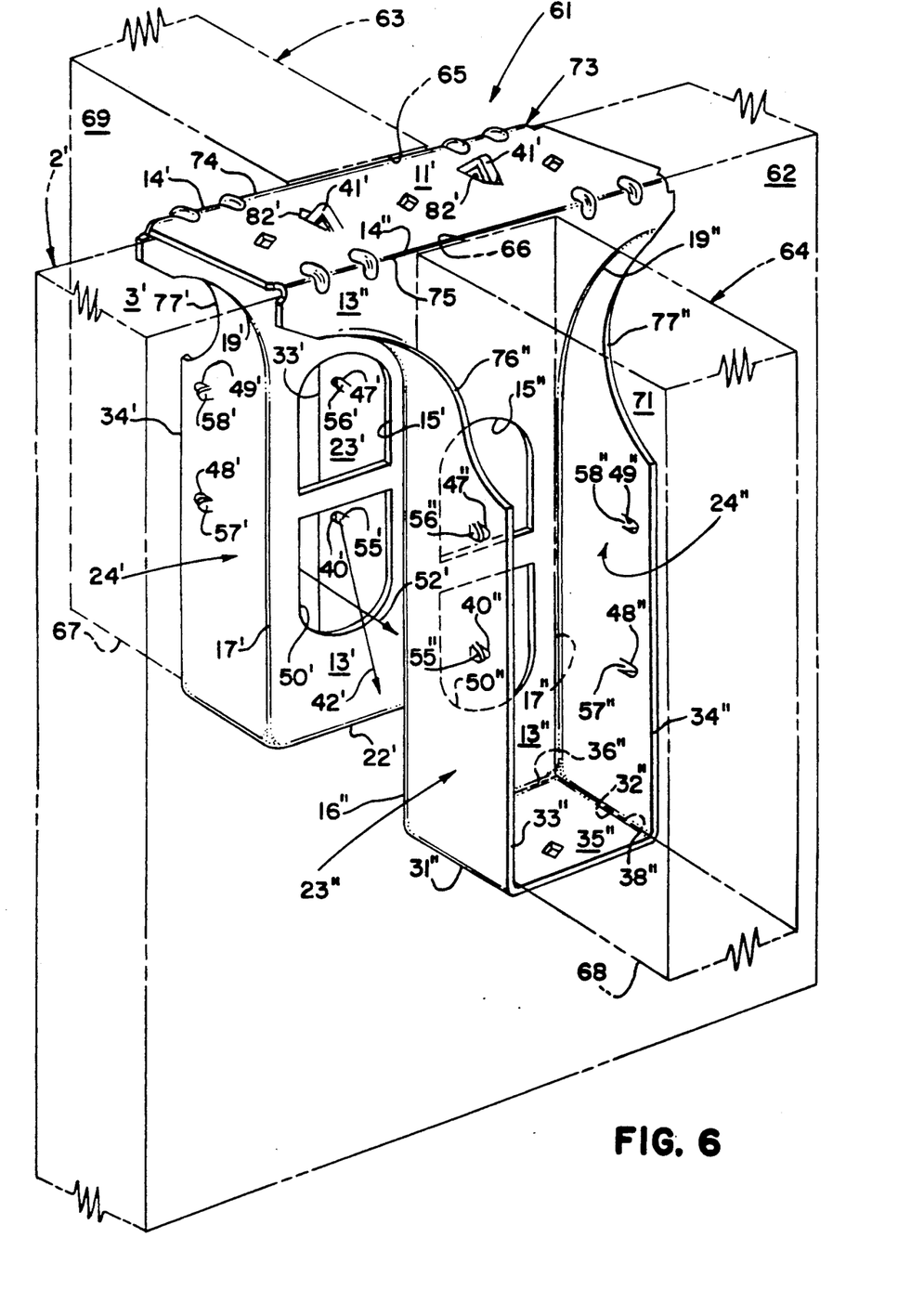
FIG. 6 is a perspective view of another form of the hanger connection of the present invention.
Figure 7:
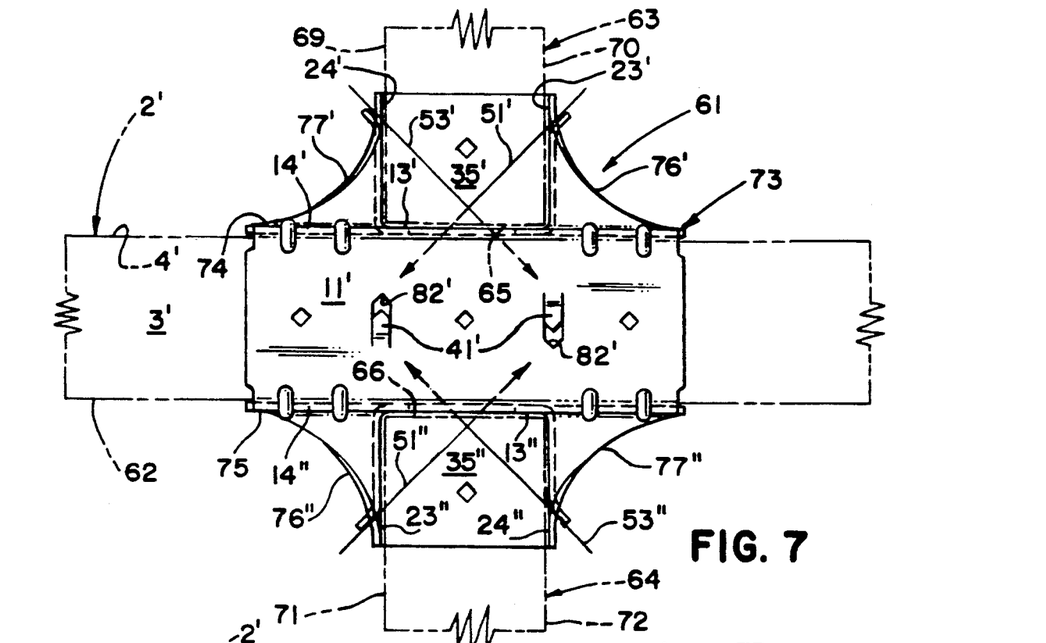
FIG. 7 is a top plan view of the hanger connection of FIG. 6.
Figure 8:
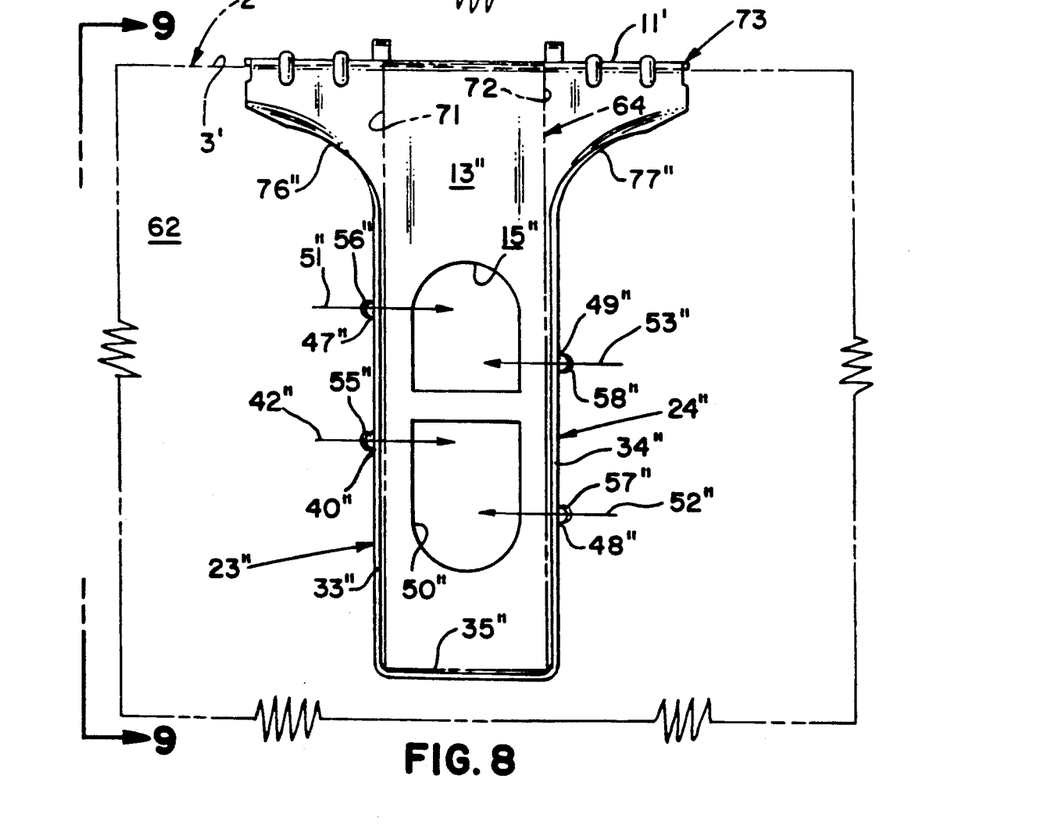
FIG. 8 is a front view of the hanger connection of FIG. 6.
Figure 9:
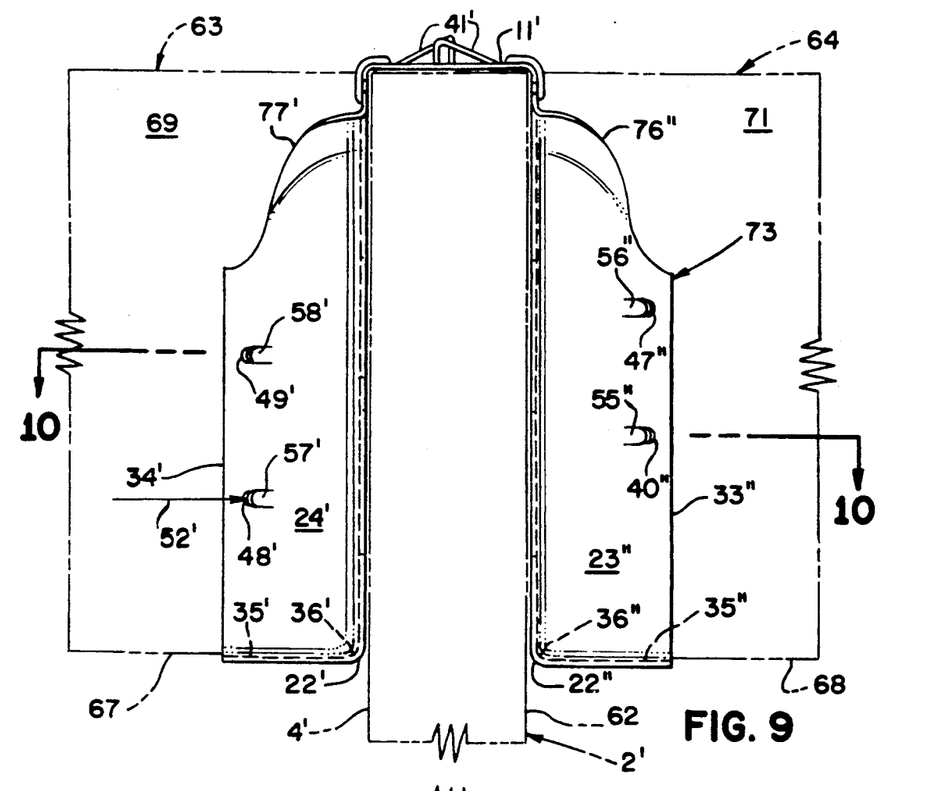
FIG. 9 is a side view of the hanger connection of FIG. 6 taken along line line 9—9 in FIG. 8.
Figure 10:
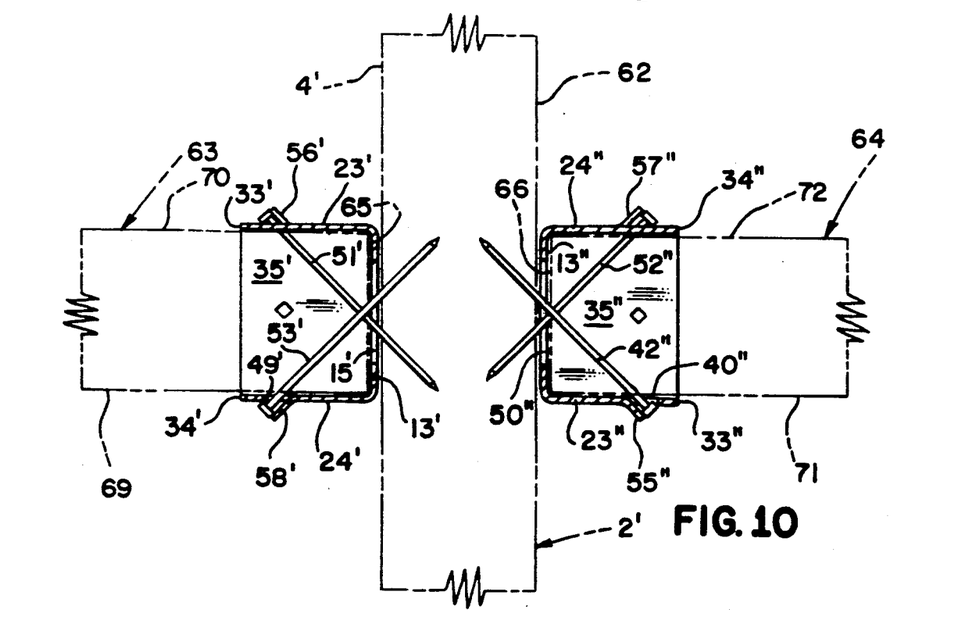
FIG. 10 is a cross sectional view of the hanger connection taken along line 10—10 in FIG. 9

The same structure for allowing first and second wood supported members 63 and 64 such as purlins to be dropped easily into the one piece double sheet metal connector 73 illustrated in FIGS. 6 and 7 consists of upper portion 76' of front edge 33' of first side flange member 23' being curved upwardly and outwardly. In like manner, upper portion 77" of front edge 34" of second side flange member 24" also curves upwardly and outwardly.

The one piece sheet metal hanger connectors 10, 73 and 73' of the present invention is constructed from a single piece of galvanized sheet stock 54, 54' or 54". Using a draw method gives a part with a uniform one-piece seat 35, 35' or 35". The process eliminates the compressed corners created by the crash method and is without use of welding or the interlocking method.

As an example, a piece of 20-gauge galvanized stock is placed into a bottom die, containing a solid punch, which is formed to the same configuration as the two end sections of a wood beam. A bottom pressure pad holds the stock at a precise pressure through the press stroke. The top die is of the same configuration as the bottom punch plus stock thickness. As the press makes its downward stroke, the stock is held between the top punch and the bottom pressure pad. Continuing downward, the stock, which is held at a precise pressure, begins to flow over and around the bottom draw punch and into the top draw die. The new part is formed to a depth slightly less than the required seat depth dimension. As the press goes over the bottom of its stroke and continues upward, the stock which now is drawn to represent the required shape is also fitted upward by the pressure pad off the bottom draw punch. The newly drawn part then has a developed shape trimmed around the undrawn bottom seat flange so as to give a consistent flat edge around the finished part. The newly trimmed part is then placed into a second redraw die that is similar in configuration as the first draw die.

The clipped seat flange is then redrawn downward so as to produce a straight drawn wall for the final seat depth. This draw die must have precise pressures and critically developed trimmed edges and radii on the draw punch and die sections to prevent splitting of the stock. Flow direction on the pressure pad face is also a critical consideration.

The one piece sheet metal hanger connector 10 and the one piece double sheet metal connector 73 are presently sold by Simpson Strong-Tie Company, Inc. under the designation PFD and PFA Post Frame Hangers. Present Hangers are sized to hold 2×4 and 2×6 joist members. Average ultimate loads vary from 2,797 pounds to 4,667 pounds. Allowable uplift loads vary from 315 pounds to 395 pounds. To attain the foregoing loads with the sizes named, 10 d size nails should be used.

We claim:

1. A hanger connection in a wood frame building including a wood supporting member having a top edge and a front face, and a wood supported member having an end face, a bottom edge and generally parallel side faces, comprising:
   a. a one piece sheet metal hanger connector including;
      (1) a top flange member disposed in registration with said top edge of said wood supporting member, and having a front edge;
      (2) a back member having a top edge integrally connected to said front edge of said top flange member along a substantial portion thereof and disposed in registration with said front face of said wood supporting member and said end face of said wood supported member and formed with at least one first fastener receiving back opening therethrough, and having side edges including upper and lower portions in which said lower portions are generally parallel to one another and said upper portions curve outwardly therefrom, and a bottom edge;
      (3) first and second side flange members disposed in registration with said side faces of said wood supported member having rear edges including upper and lower portions integrally connected to said side edges of said back member with said lower portions generally parallel and said upper portions curving outwardly therefrom, and generally parallel bottom edges, and front edges having a substantial portion parallel to one another;
      (4) a first seat member disposed in registration with a portion of said bottom edge of said wood supported member having a rear edge integrally connected to said bottom edge of said back member throughout substantially its entire width, side edges integrally connected respectively to said bottom edges of said first and second side flange members throughout substantially their entire width, and a front edge;
      (5) at least one of said first or second side flange members being formed with at least one first slotted fastener opening;
   b. top flange fastener means driven through said top flange member of said sheet metal connector into said top edge of said wood supporting member; and
   c. first flange fastener means driven through said first slotted fastener opening in at least one of said side flange members of said sheet metal connector, through a portion of said wood supported member, through said first fastener receiving back opening in said back member and into structural engagement with said wood supporting member.

2. A hanger connection as described in claim 1 wherein:
   a. said one piece sheet metal hanger connector is formed from a rectangular blank in which all four edges are generally straight lines and remain substantially uncut.

3. A hanger connection as described in claim 1 wherein:
   a. said first and second side flange members have substantially the same width as the length of said first seat member and said width remains substantially constant throughout a substantial portion of the length of said first and second side flange members.

4. A hanger connection as described in claim 3 wherein:
   a. each of said first and second side flange members are formed with a plurality of linearly disposed spaced first slotted fastener openings; and
   b. said first back member is formed with a longitudinally spaced second fastener receiving back opening; and
   c. said first flange fastener means includes a plurality of fasteners each individually driven respectively through one of said linearly disposed spaced first slotted fastener openings, through a portion of said wood supported member, through one of said first or second fastener receiving back openings in said back member and into structural engagement with said wood supporting member.

5. A hanger connection as described in claim 4 wherein:
   a. each of said first slotted fastener openings includes a tab member formed from the material created by said first slotted fastener openings which is bent to directionally guide said first flange fasteners toward one of said first or second fastener receiving back openings in said back member.

6. A double hanger connection in a wood frame building including a wood supporting member having a top edge, a front face, and a rear face and first and second wood supported members each having an end face, a bottom edge and generally parallel side faces, comprising:
   a. a one piece double sheet metal hanger connector including;
      (1) a top flange member disposed in registration with said top edge of said wood supporting member, and having front and rear edges;
      (2) a first back member having a top edge integrally connected to said front edge of said top flange member along a substantial portion thereof disposed in registration with said front face of said wood supporting member and said end face of said first wood supported member and formed with at least one first fastener receiving back opening therethrough, and having side edges including upper and lower portions in which said lower portions are generally parallel to one another and said upper portions curve outwardly therefrom, and a bottom edge;
      (3) first and second side flange members disposed in registration with said side faces of said first wood supported member having rear edges including upper and lower portions integrally connected to said side edges of said first back member with said lower portions generally parallel and said upper portions curving outwardly therefrom, and generally parallel bottom edges, and front edges having a substantial portion parallel to one another;

(4) a first seat member disposed in registration with a portion of said bottom edge of said first wood supported member having a rear edge integrally connected to said bottom edge of said first back member throughout substantially its entire width, side edges integrally connected respectively to said bottom edges of said first and second side flange members throughout substantially their entire width, and a front edge;

(5) at least one of said first or second side flange members is formed with at least one first slotted fastener opening;

(6) a second back member having a top edge integrally connected to said rear edge of said top flange member along a substantial portion thereof disposed in registration with said rear face of said wood supporting member and said end face of said second wood supported member and formed with at least one second fastener receiving back opening therethrough, and having side edges including upper and lower portions in which said lower portions are generally parallel to one another and said upper portions curve outwardly therefrom, and a bottom edge;

(7) third and fourth side flange members disposed in registration with said side faces of said second wood supported member having rear edges including upper and lower portions integrally connected to said side edges of said second back member with said lower portions generally parallel and said upper portions curving outwardly therefrom, and generally parallel bottom edges, and front edges having a substantial portion parallel to one another;

(8) a second seat member disposed in registration with a portion of said bottom edge of said second wood supported member having a rear edge integrally connected to said bottom edge of said second back member throughout substantially its entire width, side edges integrally connected respectively to said bottom edges of said third and fourth side flange members throughout substantially their entire width, and a front edge;

(9) at least one of said third or fourth flange members is formed with at least one second slotted fastener opening;

b. top flange fastener means driven through said top flange member of said one piece double sheet metal hanger connector into said top edge of said wood supporting member;

c. first flange fastener means driven through said first slotted fastener opening in at least one of said first or second side flange members of said one piece double sheet metal hanger connector, through a portion of said first wood supported member, through said first fastener receiving back opening in said first back member and into structural engagement with said wood supporting member; an d. second flange fastener means driven through said second slotted fastener opening in at least one of said third or fourth side flange members of said one piece double sheet metal hanger connector, through a portion of said second wood supported member, through said second fastener receiving back opening in said second back member and into structural engagement with said wood supporting member.

7. A double hanger connection as described in claim 6 wherein:
a. said one piece sheet metal hanger connector is formed from a rectangular blank in which all four edges are generally straight lines and remain substantially uncut.

8. A double hanger connection as described in claim 6 wherein:
a. said first and second side flange members have substantially the same width as the length of said first seat member and said width remains substantially constant throughout a substantial portion of the length of said first and second side flange members; and
b. said third and fourth side flange members have substantially the same width as the length of said second seat member and said width remains substantially constant throughout a substantial portion of the length of said third and fourth side flange members.

9. A double hanger connection as described in claim 8 wherein:
a. each of said first and second side flange members are formed with a plurality of linearly disposed spaced first slotted fastener openings;
b. said first back member is formed with a longitudinally spaced second fastener receiving back opening;
c. said first flange fastener means includes a plurality of fasteners each individually driven respectively through one of said linearly disposed spaced first slotted fastener openings, through a portion of said wood supported member, through one of said first or second fastener receiving back openings in said back member and into structural engagement with said wood supporting member;
d. each of said third and fourth side flange members are formed with a plurality of linearly disposed spaced second slotted fastener openings;
e. said second back member is formed with a longitudinally spaced second fastener receiving back opening; and
f. said second flange fastener means includes a plurality of fasteners each individually driven respectively through one of said linearly disposed spaced second slotted fastener openings, through a portion of said second wood supported member, through one of said first or second fastener receiving back openings in said second back member and into structural engagement with said wood supporting member.

10. A hanger connection as described in claim 9 wherein:
a. each of said first and second slotted fastener openings includes a tab member formed from the material created by said second slotted fastener openings which is bent to directionally guide said second flange fasteners toward one of said first or second fastener receiving back openings in said second back member.

* * * * *

UNITED STATES PATENT AND TRADEMARK OFFICE
CERTIFICATE OF CORRECTION

PATENT NO. : 5,104,252
DATED : April 14, 1992
INVENTOR(S) : Karen W. Colonias and William F. Leek It is certified that error appears in the above-identified patent and that said Letters Patent is hereby corrected as shown below:

Column 5, line 12, after the words "73 which is" insert ---formed from a rectangular blank 54' in which all four edges 43', 44', 45', and 46' are generally straight lines and remain substantially uncut.
 The double hanger connection 61 includes a one piece double sheet metal connector 73 which is---

Column 9, line 61, after the words "supporting member;" change "an" to ---and---

Signed and Sealed this

Eighth Day of June, 1993

Attest:

MICHAEL K. KIRK

Attesting Officer

Acting Commissioner of Patents and Trademarks